UNITED STATES PATENT OFFICE.

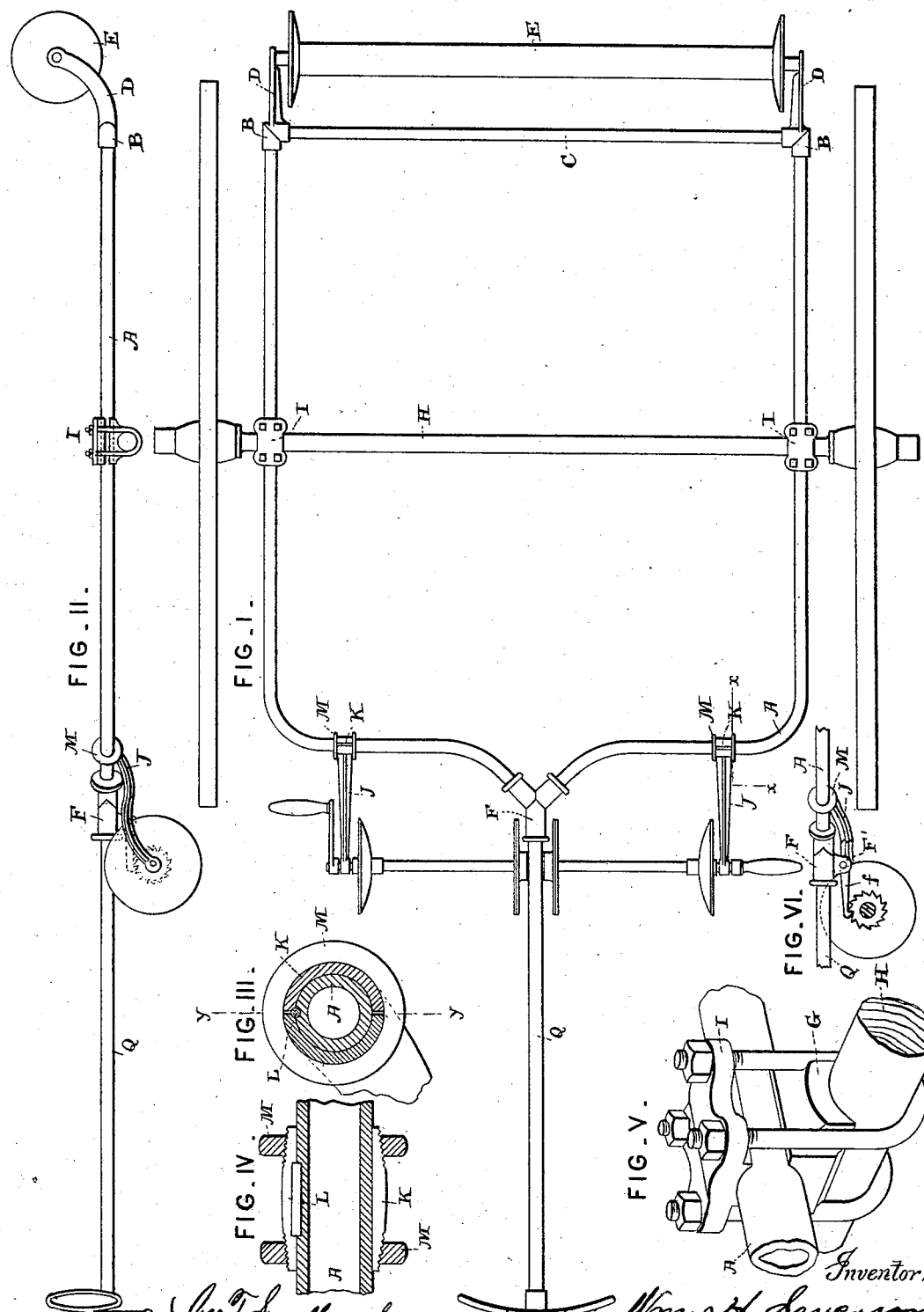

WILLIAM H. SEVERSON, OF SENECA FALLS, NEW YORK, ASSIGNOR TO THE SILSBY MANUFACTURING COMPANY, OF SAME PLACE.

HOSE-CART.

SPECIFICATION forming part of Letters Patent No. 365,448, dated June 28, 1887.

Application filed December 29, 1886. Serial No. 222,943. (No model.)

*To all whom it may concern:*

Be it known that I, WILLIAM H. SEVERSON, a citizen of the United States, residing at Seneca Falls, in the county of Seneca and State of New York, have invented certain new and useful Improvements in Hose-Carriages, of which the following is a clear, full, and exact description.

My invention has reference to hose-carts, and has for its object to construct a light, strong, and rigid hose-cart having a frame requiring less material and labor than has been required heretofore in the construction of these vehicles, and relates to various other features of novelty, hereinafter fully described, and pointed out in the claims, reference being had to the accompanying drawings, in which—

Figure I is a plan view of a hose cart having my improvements. Fig. II is a side elevation of the same. Fig. III is an enlarged sectional detail view taken on the line $xx$, Fig. I. Fig. IV is an enlarged sectional detail view taken on the line $yy$, Fig. III. Fig. V is an enlarged detail view in perspective, showing the manner of mounting the frame upon the axle. Fig. VI is a detail view.

I will here state that the frame to which my improvements are applied may be either tubular or solid.

A A represent the side and front pieces of the frame of the cart, which is formed of metal tubing or solid material, one end of each piece, A, being screwed into an elbow-joint, B, at each corner of the frame. Each elbow-joint, B, has an arm or bracket, D, which may be cast integral therewith, and which projects rearwardly and upwardly, and in which is journaled the hose-roller E. These elbow-joints are further connected together by means of a tube or bar, C, which is externally screw-threaded at each end and screws into the inwardly-projecting ends of said joints.

At the front or head of the frame is a Y joint or coupling F, in the stem of which is secured the tubular or solid tongue Q of the cart. This Y-coupling may be provided on its under side with a bracket or hanger, F', made integral therewith, in which is secured a pawl or latch, *f*, which engages with a ratchet on the rope-reel for locking the same when the required length of rope is run off. The forward ends of the side pieces, A, being bent at the desired length toward each other, and their extreme ends being screw-threaded and bent to conform with the angle of the prongs of the Y-coupling, are screwed one in each of the prongs of said coupling in order to complete the connection of the frame.

While I do not confine myself to any particular angle of Y-coupling where it connects the front of the frame, I prefer to make it ninety degrees, and consequently bend the ends of the pieces A at an angle of forty-five degrees, in order to make the joints correspond. And I also wish it understood that I do not limit myself to any particular form of frame.

For securing the frame of the cart to the axle, I provide a novel and simple means, which consists of a metal or other plate, G, at each end of the axle, having a groove in its top and one in its bottom, extending transversely of each other, and into which fit, respectively, the side pieces, A, and the ends of the axle H, the whole being clamped rigidly together by means of the double clip I. This "double saddle" G, as I call it, is perfectly adapted for the purpose, and is better, and is made at a less cost than the form heretofore used. To the forward part of the frame I attach the traction-rope reel, which is mounted in brackets. The mode of attaching these brackets to the frame is shown in detail in Figs. III and IV, the bracket J being formed integrally with one section of a hub, K, which is in two pieces, made tapering at each end and having external screw-threads thereon. A key, L, being set in grooves in the frame, the hub-sections, each pair of which also have a groove formed between their meeting edges, are placed upon the frame-piece, their grooves also receiving a portion of the key L. The collars M, which are internally screw-threaded, are screwed one on each of the tapering ends of hub K, and thus clamp the parts firmly together. The key L, in combination with the collars M, serves to prevent any movement of the hub.

Having thus described my invention, what I claim as new therein, and desire to secure by Letters Patent, is—

1. In a hose-cart, the combination, with the wheels, axle, and reel, of a tubular frame, A, a tubular tongue, Q, and a rope-reel hung by brackets to the frame A, substantially as described.

2. The combination, with the frame A and rope-reel, of the bracket J, in which said reel is journaled, said bracket having a divided hub, a division of which is integral with said bracket, said hub having tapering screw-threaded ends for the reception of internally-screw-threaded collars M, and a key, L, between said hub and frame, whereby any movement of the hub is arrested, substantially as set forth.

3. The combination, with the side and end pieces of a frame, of elbow-joints uniting them, having arms or brackets in which the hose-roller is supported, substantially as set forth.

4. The combination, with the side and end pieces of a frame, of elbow-joints uniting them, said joints having arms or brackets integral therewith, in which the hose-roller is supported, substantially as set forth.

5. The combination, with the frame and axle, of double saddles G, each having a groove in top and bottom transverse of each other, in which fit, respectively, the frame and axle, and the whole clamped together by a clip, substantially as described.

6. The combination, with the frame and tongue, of the Y-coupling F, having the bracket or hanger F', substantially as set forth.

7. The combination, with the frame and tongue, of the Y-coupling F, having the bracket or hanger F' formed integrally therewith, substantially as set forth.

8. The combination, with the frame A, the Y-coupling F, having bracket F' and the traction rope-reel, of a pawl or latch, $f$, secured in said bracket F' at one end, and a ratchet-wheel on said reel, with which engages the pawl or latch $f$, for locking said reel, substantially as set forth.

WILLIAM H. SEVERSON.

Witnesses:
LENN J. EMERY,
BENJAMIN R. HALL.